(12) United States Patent
Autrey et al.

(10) Patent No.: US 7,897,129 B2
(45) Date of Patent: Mar. 1, 2011

(54) PROCESS FOR SYNTHESIS OF AMMONIA BORANE FOR BULK HYDROGEN STORAGE

(75) Inventors: S. Thomas Autrey, West Richland, WA (US); David J. Heldebrant, Richland, WA (US); John C. Linehan, Richland, WA (US); Abhijeet J. Karkamkar, Richland, WA (US); Feng Zheng, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 178 days.

(21) Appl. No.: 12/431,496

(22) Filed: Apr. 28, 2009

(65) Prior Publication Data

US 2009/0291039 A1 Nov. 26, 2009

Related U.S. Application Data

(60) Provisional application No. 61/055,251, filed on May 22, 2008.

(51) Int. Cl.
*C01B 35/14* (2006.01)
(52) U.S. Cl. .................. 423/285; 252/188.25; 429/218.2
(58) Field of Classification Search .................. 420/900; 423/276, 286–288; 429/218.2
See application file for complete search history.

(56) References Cited

U.S. PATENT DOCUMENTS 7,695,704 B2 * 4/2010 Wolf et al. .................... 423/285

FOREIGN PATENT DOCUMENTS

WO 2007120511 A2 10/2007

OTHER PUBLICATIONS

Parry et al."The Crystalline Compound Ammonia-Borane H3NBH3" 1955, Journal of American Chemical Society, 77(22), p. 6084-6085.*
Shore et al. "Chemical Evidence for the Structure of the "Diammoniate of Diborane" The preparatio f Ammonia -Borane" 1956, American Chemical Society, vol. 80, p. 8-12.*
Brigs et al. "Kinetics of the reaction of ammonium Ion with Hydroborate Ion in liquid Ammonia"1975, Inorganic Chemistry vol. 14(9) , p. 2267-2268.*
Ramachandran, P. Veeraraghavan, et al., Preparation of Ammonia Borane in High Yield and Purity, Methanolysis, and Regeneration, Inorganic Chemistry, vol. 46, No. 19, 2007, 7810-7817.
Mayer, Erwin, Conversion of dihydridodiammineboron(III) borohydride to ammonia-borane without hydrogen evolution, Inorganic Chemistry, 12 (8), 1973, 1954-1955.
Mayer, Erwin, Symmetrical cleavage of diborane by ammonia in solution, Inorganic Chemistry, 11 (4), 1972, 866-869.
Briggs, Thomas S., et al., Kinetics of the reacion of ammonium ion with hydroborate ion in liquid ammonia, Inorganic Chemistry, 14 (9), 1975, 2267-2268.

(Continued)

*Primary Examiner* — Wayne Langel
*Assistant Examiner* — Syed Iqbal
(74) *Attorney, Agent, or Firm* — James D. Matheson

(57) ABSTRACT

The present invention discloses new methods for synthesizing ammonia borane ($NH_3BH_3$, or AB). Ammonium borohydride ($NH_4BH_4$) is formed from the reaction of borohydride salts and ammonium salts in liquid ammonia. Ammonium borohydride is decomposed in an ether-based solvent that yields AB at a near quantitative yield. The AB product shows promise as a chemical hydrogen storage material for fuel cell powered applications.

20 Claims, 1 Drawing Sheet

OTHER PUBLICATIONS

Shore, S. G. et al., Large Scale Synthesis of HB(NH)+BH- and HNBH, Inorganic Chemistry, 3 (6), 1964, 914-915.

Shore, S. G. et al., Chemical Evidence for the Structure of the "Diammoniate of Diborane." II. The Preparation of Ammonia Borane, Journal of the American Chemical Society, 80 (1), 1958, 8-12.

PCT International Search Report/Written Opinion.

Heldebrant, David J. et al., Synthesis of Ammonia Borane for Hydrogen Storage Applications, Energy and Environmental Science, Royal Society of Chemistry, vol. 1, No. 1, Jul.1, 2008.

Langmi, Henrietta W. et al., Non-Hydride Systems of the Main Group Elements as Hydrogen Storage Materials, Coordination Chemistry Reviews, Elsevier Science, Amsterdam, NL, vol. 251, No. 7-8, Feb. 13, 2007.

Shore, S. G. et al., Chemical Evidence for the Structure of the Diammoniate of Diborane. II. The Preparation of Ammonia-Borane, Journal of the American Chemical Society, American Chemical Society, Washington DC, US, vol. 80, Jan. 1, 1958.

Parry, R. W. et al., The Preparation and Properties of Hexamminecobalt (III) Borohydride, Hexamminechromium (III) Borohydride and Ammonium Borohydride, Journal of the American Chemical Society, vol. 80, Jan. 11, 1958.

Krumpol, M., Ammonium Borohydride—A Novel, Hydrogen-Rich Material for Polarized Targets, AIP Conference Proceedings, vol. 95, Mar. 15, 1983.

* cited by examiner

PROCESS FOR SYNTHESIS OF AMMONIA BORANE FOR BULK HYDROGEN STORAGE

CROSS REFERENCE TO RELATED APPLICATION

This application claims priority from Provisional application No. 61/055,251 filed 4 Apr. 2007, incorporated in its entirety herein by reference.

GOVERNMENT SUPPORT

This invention was made with Government support under Contract DE-AC0676RLO-1830 awarded by the U.S. Department of Energy. The Government has certain rights in the invention.

FIELD OF THE INVENTION

The present invention relates generally to methods for the synthesis of ammonia borane. More particularly, the invention relates to a new method for the synthesis of ammonia borane in liquid ammonia and an ether-based solvent that provides ammonia borane at a high yield and a high purity.

BACKGROUND OF THE INVENTION

Many research groups around the world are investigating approaches to accelerate the discovery and development of hydrogen storage materials and systems to meet Department of Energy (DOE) 2015 system-based targets. A hydrogen storage system includes all the components required to get hydrogen from a hydrogen storage material and provide it to the end device or operating system, e.g., a fuel cell. System components can include, e.g., storage tanks, heat exchangers, valves, tubing, pumps, and other components. However, weights must be considered before each individual component can be considered as a component within the selected operating system. System target goals have been developed through the FreedomCAR Partnership between DOE and the US Council for Automotive Research (USCAR, www.uscar.org). Ammonia borane ($NH_3BH_3$), denoted herein as (AB), has a potential to meet established targets for a viable hydrogen storage material and to provide hydrogen for use as an operating fuel. Several processes are described in the literature for synthesizing ammonia borane AB. In the conventional metathesis approaches, synthesis of AB involves two undesired pathways that involve formation of DADB, the ionic dimer of AB, as shown hereafter:

$$2NH_4BH_4 \rightarrow 2AB + 2H_2 \quad 2AB \rightarrow DADB \quad (A)$$

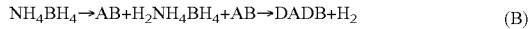

$$NH_4BH_4 \rightarrow AB + H_2 NH_4BH_4 + AB \rightarrow DADB + H_2 \quad (B)$$

In pathways (A) and (B), $NH_4BH_4$ decomposes to form AB with loss of $H_2$ gas. However, as AB is formed, AB can dimerize as in pathway (A) to form DADB or can lose hydrogen and form polymeric polyaminoborane (PAB), a decomposition product. Alternatively, AB can also react with $NH_4BH_4$ as in pathway (B) to form DADB or PAB. Increasing the AB concentration or temperature increases the likelihood of reactions that form DADB and PAB. In these approaches, DADB is a competing reaction component that can decrease the yield of AB. In an alternative metathesis approach performed in an organic solvent, dilute reactant concentrations were used in an attempt to prevent DADB or PAB formation. However, low yields of AB were obtained. In another approach known in the art, an attempt was made to promote $H_2$ loss from $NH_4BH_4$ in $NH_3$ to form AB by heating (e.g., at 40° C.), but various and multiple reaction products were obtained by heating the $NH_3$ solution that decreased the yield of AB as well as the purity of the product. In short, current methods are limited by problems including, e.g., dilute reactant concentrations; competing side reactions and products including, e.g., polymeric products (e.g., DADB and PAB); complex product recovery; toxic solvents; low product purity; and low product yields. Accordingly new methods are needed that improve reaction efficiencies and provide greater yields of AB at a greater purity.

TERMS

The following terms are used herein.

The term "liquid ammonia" means anhydrous ammonia in the liquid state; not ammonia water.

The term "sequential" refers to process steps that are performed serially, i.e., one by one, or one after the other.

The term "parallel" refers to process steps that are generally performed together or simultaneously, e.g., by adding one or more required reagents at the same time, or conducting one or more reaction steps simultaneously.

The term "near-quantitative" as used herein means greater than or equal to 99% of the theoretical yield. A quantitative yield means 100% of the theoretical yield for the reaction.

SUMMARY OF THE INVENTION

In one aspect, the invention is a new method for synthesis of ammonia borane. The method includes the steps of: reacting a preselected quantity of a borohydride salt and an ammonium salt in liquid ammonia at a preselected temperature and pressure forming ammonium borohydride; and adding a preselected quantity of an ether-based solvent to ammonium borohydride to form ammonia borane (AB) at a high yield and a high purity. The invention overcomes: need for toxic solvents, dilute reagent conditions, complex product isolation and recovery, competing side reactions and side reaction products, low product yields, and low product purity. Yield of ammonia borane is greater than or equal to about 90%. More particularly, yield of AB is greater than or equal to about 99%. In one embodiment, yield of AB is greater than or equal to 99% by weight with a purity greater than or equal to 99%. The liquid ammonia ($NH_3$) solvent overcomes unwanted side reactions and maximizes formation of AB. Concentration of the ammonia ($NH_3$) is greater than or equal to about 10 percent by weight. Ether-based solvents include, but are not limited to, e.g., glyme; diglyme; ether; tetrahydrofuran (THF); and combinations of these solvents. The invention provides concentrations of AB up to about 2.5M currently in the ether-based solvent. Temperatures for conducting the reactions can be varied. In particular, temperatures can range from about −80° C. to about 25° C. More particularly, temperatures can range from about −40° C. to about 25° C. Various ammonia ($NH_3$) pressures can also be used. Ammonia pressures can be selected in the range from about 1 atmosphere (for low-temperature syntheses) up to about 20 atmospheres at near room temperature synthesis conditions. Preferred synthesis conditions are 0-25° C. at 100-300 psia of $NH_3$, but conditions are not limited thereto.

In one embodiment, liquid ammonia is not removed.

In one embodiment, a borohydride salt reactant is mixed with an ammonium salt reactant to form borohydride ($NH_4BH_4$) solid at an elevated temperature (15° C.) under a $NH_3$ partial pressure of 7.2 atm. that maintains liquid ammonia conditions.

In another embodiment, a temperature of −40° C. and an $NH_3$ partial pressure of 1 atm. are used.

In various embodiments, the borohydride salt can include a constituent selected from: Na, Li, K, Mg, Ca, including combinations of these constituents.

In one embodiment, the ammonium salt includes an anion that is a halide or another anion. In various embodiments, the ammonium salt anion is selected from, e.g., Cl—, Br—, F—, I—, $SO_4^{2-}$, $CO_3^{2-}$, $HCO_2^{1-}$, $PO_4^{3-}$, and combinations of these anions.

In one embodiment (sequential addition process), a borohydride salt is mixed with an ammonium salt in liquid ammonia solvent to form ammonium borohydride ($NH_4BH_4$). The liquid ammonia (and any $NH_3$ not complexed to the $NH_4BH_4$) is removed and a mixture of ammonium borohydride ($NH_4BH_4$) and NaCl is isolated as a polycrystalline solid. An ether-based solvent is subsequently introduced to form the final AB product. NaCl is removed (e.g., by filtering) and the AB is recovered at a high yield.

In another embodiment (parallel addition process), a borohydride salt is mixed with an ammonium salt in liquid ammonia solvent to form ammonium borohydride ($NH_4BH_4$). An ether-based (secondary) solvent is then added to the liquid ammonia containing the ammonium borohydride [i.e., $NH_4BH_4$ is not recovered (isolated) from the solvent before addition of the ether] to form the final AB product at a high yield.

In yet another embodiment (parallel addition process), a borohydride salt reactant (e.g., $LiBH_4$) is introduced in an ether-based solvent (e.g., as $LiBH_4$:THF) to the primary liquid ammonia solvent before the metathesis reaction with the ammonium salt has occurred. This synthesis demonstrates that isolation from liquid ammonia is not required and that reactants can be added simultaneously (i.e. in parallel). The method can further include the steps of refluxing ammonia and continuously venting $H_2$ gas while forming the ammonia borane product.

In one embodiment, reactions that yield AB are performed sequentially (serially). Alternatively, one or more of the reaction steps can be conducted sequentially.

In another embodiment, reactions are performed in parallel. Alternatively, one or more of the reaction steps can be conducted in parallel. The synthesis of AB can be performed as a batch reaction or as a reaction process that is continuous. AB can be recovered by isolating AB from the reaction medium and/or filtering.

In one embodiment, filtering is performed using, e.g., a fritted glass filter or a filter that is filter paper.

In one embodiment, the method is performed in a continuous reaction process.

A more complete appreciation of the invention will be readily obtained by reference to the following description of the accompanying drawings.

DETAILED DESCRIPTION OF THE INVENTION

The present invention includes new methods for synthesizing ammonia borane (AB) that provide yields of AB that are nearly quantitative (>99%). Methods described herein are expected to be feasible for industrial-scale production of AB, e.g., for bulk hydrogen storage, e.g., for fuel cell-powered vehicles and other devices; solvent recycling; and other industrial applications. In the present invention, metathesis reactions that form ammonium borohydride ($NH_4BH_4$) are conducted in a liquid ammonia solvent. The ammonium borohydride ($NH_4BH_4$) intermediate is stable in the liquid ammonia ($NH_3$). And, liquid ammonia prevents side reactions from occurring during the metathesis reactions that form ammonium borohydride that would normally undermine AB yield. Addition of an ether-based organic solvent initiates loss of $H_2$ gas from ammonium borohydride and forms AB at a high yield and a high purity. The loss of $H_2$ from the $NH_4BH_4$ occurs at a low temperature that eliminates need for a heating step in conventional $NH_3$-only solvent systems. While the present invention is described herein with reference to the preferred embodiments thereof, it should be understood that the invention is not limited thereto, and various alternatives in form and detail may be made therein without departing from the scope of the invention. Two new processes for synthesis of (AB) will now be described.

Synthesis (I)

Sequential Addition

Figure 1:
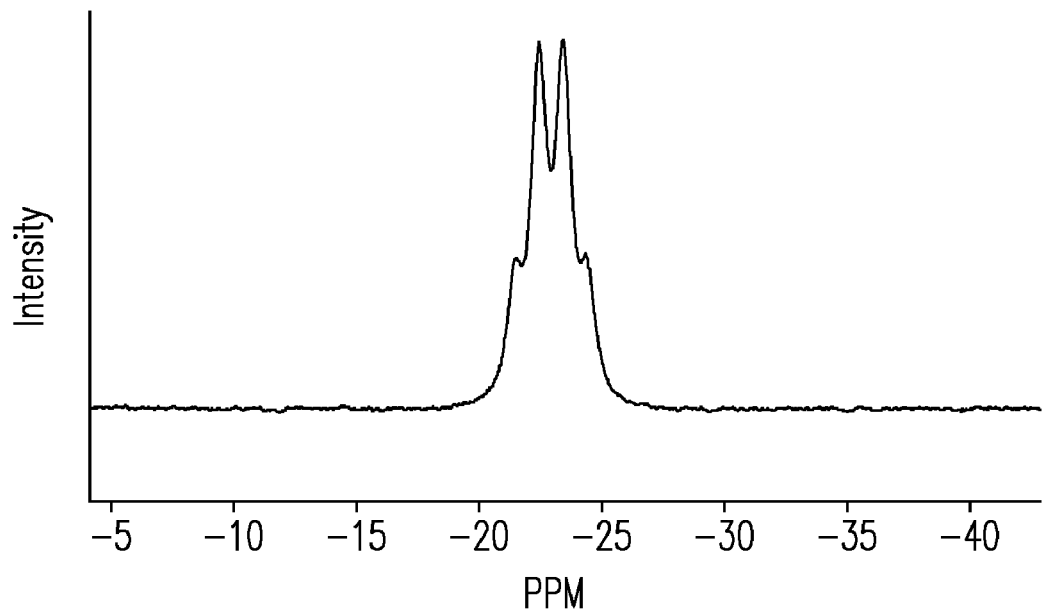
FIG. 1 is a $^{11}$B-NMR plot of ammonia borane (AB) synthesized in accordance with the invention.

In one embodiment of the invention, a new sequential addition process for formation of AB includes the steps of: (1) reacting a $MBH_4$ salt and a $NH_4X$ salt in liquid ammonia ($NH_3$) at a preselected temperature and pressure to form $NH_4BH_4$; (2) removing liquid ammonia solvent (any non-complexed $NH_3$) to recover (isolate) $NH_4BH_4$; and (3) adding an ether-based solvent (e.g., THF) to form AB at a high yield and a high purity. Yield of (AB) synthesized in accordance with the invention is near the theoretical yield. In particular, yield of AB is greater than or equal to 90% by weight. More particularly, yield of AB is greater than or equal to 99% by weight. The near quantitative yield of AB (>90% by weight) represents an unexpected result given the low yields of (AB) from metathesis reactions reported in the literature. Purity of the AB product obtained is also high. In particular, purity is greater than or equal to 90%. More particularly, purity is greater than or equal to 99%. FIG. 1 is a $^{11}$B-NMR plot of ammonia borane (AB) obtained in accordance with Synthesis I that demonstrates the purity of the AB product. Reactant salts can be added sequentially (i.e., one by one) into liquid ammonia. Alternatively, a first salt ($MBH_4$ or $NH_4X$) can be mixed into liquid ammonia followed by addition of a second salt. Alternatively, salts can be mixed together and then introduced into liquid ammonia. In short, the invention is not limited by the order at which salts and/or solvents are added. Temperatures for conducting the reactions can be varied. In particular, temperatures can range from about −80° C. to about 25° C. More particularly, temperatures can range from about −40° C. to about 25° C. Manner for applying temperatures is not limited. For example, temperature can be held constant, altered, or ramped during AB synthesis. Alternatively, one or more temperatures can be applied for each process step. Thus, no limitations are intended. Various ammonia ($NH_3$) pressures can also be used. Ammonia pressures are preferably selected in the range from about 1 atmosphere for the low-temperature syntheses (−80° C. to about 0° C.) up to about 20 atmospheres for near-room temperature syntheses (0° C. to about 25° C.). At a given temperature, pressures are selected above the partial pressure of ammonia so as to maintain the liquid ammonia environment. The method can be performed in a single reaction vessel, i.e., a so-called 'one-pot' synthesis. An unexpected result is that liquid ammonia ($NH_3$) suppresses formation of DADB and other competing side reactions that normally decrease the yield of AB. As a result, a greater concentration of the desired (AB) product in the ether-based solvent is achieved, e.g., up to about 2.5M—a factor 2.5 times greater than maximums reported in the research literature currently. In the present invention, the addition of ether-based solvent, only after $NH_4BH_4$ is fully and completely formed in liquid ammonia, initiates $H_2$ loss that converts $NH_4BH_4$ and provides the AB product at a high yield and a high purity. Use of concentrated liquid ammonia ($NH_3$) in the metathesis reactions of $NH_4X$ and $MBH_4$ salts for the synthesis of AB provides at least four beneficial effects. Liquid ammonia stabilizes $NH_4BH_4$ making it less reactive towards AB. It also facilitates phase separation of $NH_4BH_4$ from AB, preventing formation of DADB. Liquid ammonia solvent can be removed prior to addition of the ether-based solvent, as described herein. However, some ammonia molecules remain complexed to the $NH_4BH_4$ solid, which aides in the increased yields obtained by the present invention. These molecules complex with any $BH_3$ (a likely key intermediate formed during $H_2$ release from $NH_4BH_4$) acting as a $BH_3$ trap, which prevents $BH_3$ from decomposing to form side products. The ammonia also suppresses AB dimerization that can form DADB, thus allowing greater reactant salt concentrations to be used for AB synthesis. And, results demonstrate that DADB was not found during the metathesis reactions of the present invention in liquid ammonia solvent. In sum, the combination: 1) of forming $NH_4BH_4$ in liquid ammonia; and 2) adding ether-based solvent to initiate loss of $H_2$ eliminates the need to heat liquid ammonia (i.e., to 40° C.) to evolve $H_2$ as taught in the prior art, which heating promotes side reactions, generates undesired reaction products, and results in lower yields of AB.

Synthesis (II)

Parallel Addition

Figure 2:
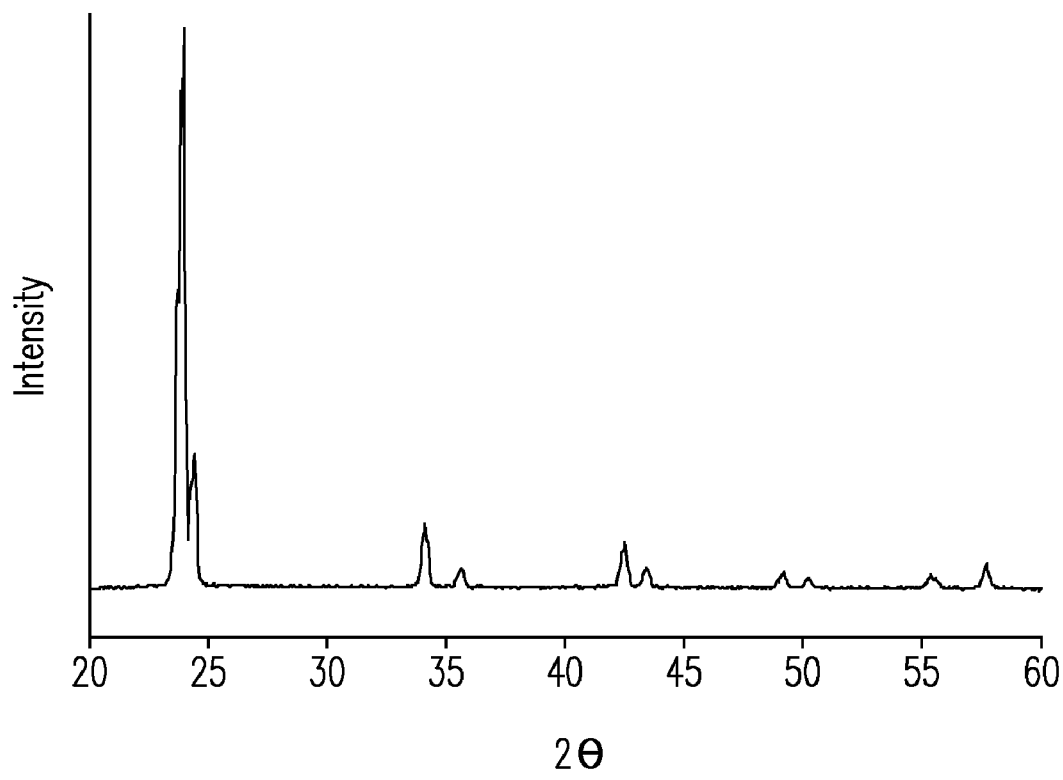
FIG. 2 is an X-ray diffraction (XRD) plot of AB synthesized in accordance with the invention.

In another embodiment of the invention, a parallel addition process for formation of AB includes the steps of: (1) reacting a $MBH_4$ salt and a $NH_4X$ salt in liquid ammonia ($NH_3$) at a preselected temperature and pressure to form $NH_4BH_4$; and (2) adding an ether-based solvent (e.g., THF) to the liquid ammonia containing $NH_4BH_4$ to form AB at a high yield and a high purity. Yield of (AB) synthesized in accordance with the invention is near the theoretical yield. In particular, yield of AB is greater than or equal to 90% by weight. More particularly, yield of AB is greater than or equal to 99% by weight. Purity of the AB product is also high. In particular, purity is greater than or equal to 90%. More particularly, purity is greater than or equal to 99%. FIG. 2 is an X-ray diffraction (XRD) plot of (AB) synthesized in accordance with Synthesis II that demonstrates the purity of the (AB) product. Melting point determinations showcase the purity of the (AB) product. Impure (AB) melts at temperatures, e.g., below about 100° C., while highly pure (AB) melts at 110° C. The (AB) product obtained from Syntheses I and II both melted at 110° C., indicating a highly pure (AB) product. In the instant process, reactant salts are added together (i.e., in parallel) into liquid ammonia to form ammonium borohydride ($NH_4BH_4$). Alternatively, the liquid ammonia can be added to the starting salts to form ammonium borohydride ($NH_4BH_4$). Results demonstrate that the order of addition of the salts and/or solvents does not affect yield of AB. For example, the ether-based solvent [e.g., tetrahydrofuran (THF)] can be added to the liquid ammonia solvent containing ($NH_4BH_4$) formed in step (1) without removing the liquid ammonia. The process can also be performed in a single reaction vessel, i.e., so-called 'one-pot' synthesis. Temperatures for conducting the reactions can be varied. In particular, temperatures can range from about −80° C. to about 25° C. More particularly, temperatures can range from about −40° C. to about 25° C. Manner for applying temperatures is not limited. For example, temperature can be held constant, altered, or ramped during AB synthesis. Alternatively, one or more temperatures can be applied for each process step. Thus, no limitations are intended. In the present invention, addition of ether-based solvent after $NH_4BH_4$ is formed in liquid ammonia initiates $H_2$ loss that converts the $NH_4BH_4$ to AB product at a high yield and a high purity. The combination: 1) of forming $NH_4BH_4$ in liquid ammonia and 2) adding ether-based solvent to initiate loss of $H_2$ eliminates the need to heat liquid ammonia to 40° C. to evolve $H_2$ as taught in the prior art, which heating promotes side reactions, yields undesired reaction products, and results in poorer yields of AB. Various ammonia ($NH_3$) pressures can also be used. Ammonia pressures are preferably selected in the range from about 1 atmosphere for the low-temperature syntheses (−80° C. to about 0° C.) up to about 20 atmospheres for near-room temperature syntheses (0° C. to about 25° C.). At a given temperature, pressures are selected above the partial pressure of ammonia so as to maintain the liquid ammonia environment. An unexpected result is that liquid ammonia ($NH_3$) suppresses formation of DADB and other competing side reactions that normally decrease the yield of AB. As a result, a greater concentration of the (AB) product in the ether-based solvent is achieved, e.g., up to about 2.5M—a factor 2.5 times greater than maximums currently reported in the research literature. Use of concentrated liquid ammonia ($NH_3$) in the metathesis reactions of $NH_4X$ and $MBH_4$ salts for the synthesis of AB provides at least four beneficial effects. Liquid ammonia stabilizes $NH_4BH_4$ making it less reactive towards AB. It also facilitates phase separation of $NH_4BH_4$ from AB, preventing formation of DADB. When liquid ammonia solvent is removed prior to addition of the ether-based solvent, some ammonia molecules presumably remain complexed to the $NH_4BH_4$ solid. The complexed ammonia acts as a $BH_3$ trap by complexing with any $BH_3$ (a likely key intermediate formed during $H_2$ release from $NH_4BH_4$) which prevents $BH_3$ from decomposing to form side products. The ammonia also suppresses AB dimerization that can form DADB or PAB, thus allowing use of greater concentrations of reactant salts for synthesis. Neither DADB nor PAB was found during the metathesis reactions in the liquid ammonia solvent. The complexed ammonia thus appears to provide observed enhancements demonstrated by the invention.

The following examples provide further details of the invention.

EXAMPLE 1

Sequential Addition (1)

Low Salt Concentration

In a first experiment [sequential addition and low salt concentration], anhydrous $NH_3$ (25 mL) was condensed in an oven dried 100 mL 3-neck round bottom flask fitted with a stir bar. The flask was cooled in a dry-ice/isopropanol bath (−78° C.) open to a nitrogen atmosphere. Both $NH_4Cl$ (1 g, 18.6 mmol) and $NaBH_4$ (0.71 g, 18.6 mmol) were added to the reaction flask using a solids addition funnel. The mixture was stirred for 2 hours under a nitrogen atmosphere at −78° C. Liquid ammonia ($NH_3$) was removed by vacuum, leaving a mixture consisting of NaCl and $NH_4BH_4$ as a white polycrystalline solid. Anhydrous THF (100 mL) was then cannulated in under a nitrogen atmosphere over the white solid at −78° C. open to a nitrogen bubbler. After THF addition, the white solid began to foam and release hydrogen. The slurry was stirred at −78° C. for 30 minutes and then slowly warmed to room temperature and stirred for an additional 60 minutes when no more gas evolution was observed. The NaCl was filtered and the THF removed by rotary evaporation to yield 0.57 g of a microcrystalline powder. Purity of the product was based on XRD and $^{11}B$ NMR results. In particular, $^1H$ NMR d-glyme showed a slight triplet at 3.8 ppm ($NH_3$, $J_{N-H}$=45 Hz) and a 1:1:1:1 quartet centered at 1.5 ppm ($BH_3$, $J_{B-H}$=94 Hz). $^{11}B$ NMR showed a quartet −23 ppm ($BH_3$, $J_{B-H}$=93 Hz), and a ~99% yield of $NH_3BH_3$.

EXAMPLE 2

Sequential Addition (2)

High Salt Concentration

In a second experiment [sequential addition and high salt concentration], $NH_4BH_4$ was prepared by addition of $NaBH_4$ and $NH_4Cl$ (18.6 mmol of each reagent) in liquid ammonia at −78° C. The reaction mixture was stirred for 1 hour under a nitrogen atmosphere before warming to −40° C. to remove the ammonia solvent under vacuum. The vessel was kept at −40° C. in a slush bath while THF (50 mL) was slowly added to the flask resulting in significant gas evolution through the nitrogen bubbler. The slurry was stirred at −40° C. for an additional 60 minutes, following which the flask was warmed to room temperature. Insoluble salts were filtered from THF-soluble products. Purity of the product was based on XRD and $^{11}B$ NMR results.

EXAMPLE 3

Parallel Addition (1)

High Salt Concentration

In another experiment [parallel addition and high salt concentration], anhydrous $NH_3$ (10 mL) was condensed in an oven dried 100 mL 3-neck round bottom flask fitted with a stir bar. The flask was cooled in a dry-ice/isopropanol bath (−78° C.) and open to a nitrogen atmosphere. $NH_4Cl$ (1.06 g, 18.6 mmol) and $NaBH_4$ (0.71 g, 18.6 mmol) were added by solids addition funnel to the three neck flask and the reaction was stirred for 2 hours under nitrogen at −78° C. Anhydrous THF (100 mL) was slowly added drop-wise to the flask via addition funnel and $NH_3$ and $H_2$ were allowed to evaporate while thawing the reaction to room temperature and then stirred for another hour. Precipitated NaCl was filtered away through filter paper. THF was then removed by rotary evaporation, followed by drying under vacuum overnight. 0.58 g of the AB product [$NH_3BH_3$] was recovered as a microcrystalline powder (18.4 mmol, 99% yield). Purity of the product based on XRD and $^{11}B$ NMR results. $^1H$ NMR d-glyme showed a slight triplet at 3.8 ppm ($NH_3$, $J_{N-H}$=45 Hz) and a 1:1:1:1 quartet centered at 1.5 ppm ($BH_3$, $J_{B-H}$=94 Hz). $^{11}B$ NMR showed a quartet −23 ppm ($BH_3$, $J_{B-H}$=93 Hz).

EXAMPLE 4

Parallel Addition (2)

Low Salt Concentration

Presence of an Ether Mixed Salt

In another experiment [parallel addition; low salt concentration; presence of ether-mixed salt], anhydrous $NH_3$ (25 mL) was condensed in an oven dried 100 mL 3-neck round bottom flask fitted with a stir bar. The flask was cooled in a dry ice/isopropanol bath (−78° C.) and open to a nitrogen atmosphere. 9.3 mL of 2 M $LiBH_4$:THF (18.6 mmol) was added to 50 mL anhydrous THF and loaded in an addition funnel and slowly added dropwise to the $NH_3$. 0.408 g of $NH_4F$ (11.0 mmol) was loaded in a glove box into a solid addition funnel. The solid addition funnel was connected to the flask, and the $NH_4F$ was slowly added to the $NH_3$ and stirred for 1.25 hours under nitrogen atmosphere at −78° C. The flask was then slowly thawed while stirring under $N_2$, allowing the $NH_3$ and $H_2$ gases to evolve slowly. The slurry was stirred at −78° C. for 2 hours and then after gas evolution ceased, precipitated NaCl was filtered away through filter paper. THF was removed by rotary evaporation, followed by drying under vacuum overnight. 0.420 g (125% yield) of a mixture of $LiBH_4$ and $NH_3BH_3$ was recovered as a microcrystalline powder at a 99% yield of AB after $LiBH_4$ was removed. Purity of the product was based on XRD and $^{11}B$ NMR results. $^{11}B$ NMR in d-glyme showed a quartet −23 ppm ($BH_3$, $J_{B-H}$=94 Hz, 87%) and a pentet −41 ppm ($BH_4$, $J_{B-H}$=82 Hz).

EXAMPLE 5

Parallel Addition (3)

High Salt Concentration 15.5° C.; 100 psia $NH_3$

In another experiment [parallel addition; high salt concentration; high temperature; ammonia partial pressure], $NH_4Cl$ (12.26 g, 0.324 mol) and $NaBH_4$ (17.33 g, 0.324 mol) were added to a 300 mL Hastelloy reactor vessel fitted with a magnetic drive stirrer. The reactor was purged with nitrogen gas and equilibrated to a process temperature of 15° C. While the reactor was stirred continuously, 105 mL of liquid ammonia was injected into the reactor from a syringe pump at 5 mL/min. This step pressurized the reactor to about 6.9 bar. After 30 minutes, 125 mL THF was injected at 5 mL/min with stirring to initiate hydrogen gas release. The injection of THF liquid alone pressurized the reactor to about 200 psia. This pressure build-up was relieved by venting the reactor through a stainless steel condenser. The condenser head had been previously cooled to a set point of 0° C. with a back pressure of 6.9 bar, and it was maintained at such conditions to reflux ammonia. The hydrogen gas released by reaction was vented continuously through the condenser. The reaction was allowed to complete under constant stirring for 48 hours. The back pressure was slowly released to boil off ammonia. When the reactor pressure dropped to near ambient level, it was purged with nitrogen gas for an additional 3.5 hour to remove residual ammonia gas. The dissolved reaction product was separated on a medium porosity glass frit. The solid NaCl byproduct was rinsed with 100 mL THF and the filtrate was collected and combined with the filtrate from the first filtration. THF was removed from the filtrate by rotary evaporation, followed by drying under vacuum overnight. The product was dissolved in diethyl ether and recrystallized to remove any residual ammonia. The diethyl ether was then removed by rotary evaporation, followed by drying under vacuum overnight. $NH_3BH_3$ (9.82 g) was recovered as a microcrystalline powder (0.318 mol, 98% yield). Purity of the product was based on XRD and $^{11}B$ NMR results. $^1H$ NMR d-glyme showed a slight triplet at 3.8 ppm ($NH_3$, $J_{N-H}$=45 Hz) and a 1:1:1:1 quartet centered at 1.5 ppm ($BH_3$, $J_{B-H}$=94 Hz). $^{11}B$ NMR showed a quartet −23 ppm ($BH_3$, $J_{B-H}$=93 Hz).

TABLE 2 compares results from the syntheses detailed in Examples 1-5.

TABLE 2

Reactants and conditions for Synthesis of Ammonia Borane (AB) in accordance with the invention.

| SYNTHESIS | BH SOURCE | NH SOURCE | AMMONIA BOROHYDRIDE ($NH_4BH_4$) (MOLARITY IN $NH_3$) | AMMONIA BORANE ($NH_3BH_3$) (MOLARITY IN THF) | SOLVENT | YIELD AB (%) |
|---|---|---|---|---|---|---|
| 1 | $NaBH_4$ | $NH_4Cl$ | 0.74 | 0.20 | $NH_3$/THF* | 99 |
| 2 | $NaBH_4$ | $NH_4Cl$ | 1.90 | 0.20 | $NH_3$/THF* | 99 |
| 3 | $NaBH_4$ | $NH_4Cl$ | 1.90 | 0.20 | $NH_3$/THF | 99 |
| 4 | $LiBH_4$:THF** | $NH_4F$ | 0.74 | 0.18 | $NH_3$/THF | 99 |
| 5 | $NaBH_4$ | $NH_4Cl$ | 3.10 | 2.56 | $NH_3$/THF (15.5° C.; 100 psia $NH_3$) | 98 |

*$NH_4BH_4$ was isolated and $NH_3$ removed prior to addition of THF solvent in these experiments.
**Lithium borohydride salt was acquired in THF solvent and used without modification.

In the table, near-quantitative yields of AB were obtained under various reaction conditions. Results are described further hereafter.

In synthesis 1 (sequential addition, Example 1), AB was formed at a near quantitative yield. A borohydride salt was mixed with an ammonium salt in liquid ammonia to form solid ammonium borohydride ($NH_4BH_4$). A mixture of NaCl and ammonium borohydride (including any complexed $NH_3$) was recovered (isolated) from liquid ammonia solvent as a polycrystalline solid. Addition of THF to the solid containing $NH_4BH_4$ produced AB at a near quantitative yield. Low salt concentrations were used. These experiments demonstrated: 1) that the DADB formation pathway is not critical, and 2) decomposition of ammonium borohydride ($NH_4BH_4$) to DADB does not occur when liquid ammonia is present at a concentration greater than about 10 wt %, a surprising result.

In synthesis 2 (sequential addition, Example 2), a borohydride salt was mixed with an ammonium salt in liquid ammonia to form solid ammonium borohydride ($NH_4BH_4$). A mixture of NaCl and ammonium borohydride (including any complexed $NH_3$) was again isolated from liquid ammonia solvent as a polycrystalline solid. Addition of THF to the solid containing $NH_4BH_4$ produced AB at a near quantitative yield. Results demonstrate that not only is the DADB formation pathway not required, dilute concentrations of reactant salts are not required, another surprising result. Use of concentrated reactant salts will assist industrial-scale production of AB. And, again, undesirable side reactions including, e.g., decomposition of ammonium borohydride ($NH_4BH_4$) to DADB, is controlled when liquid ammonia is present at a concentration >10 wt %. Finally, results demonstrate that complete removal of ammonia in the reaction synthesis is not required.

In synthesis 3 (parallel addition, Example 3), a borohydride salt was mixed with an ammonium salt simultaneously (i.e., in parallel) in liquid ammonia to form solid ammonium borohydride ($NH_4BH_4$). Addition of THF to $NH_4BH_4$ solid in liquid ammonia produced AB at a near quantitative yield. This experiment demonstrates the feasibility of simultaneous reaction processing; one or more reactants can be added to the solvent phase in parallel. Results demonstrate that the ether-based solvent (e.g., THF) does not have to be added only after the metathesis reaction has happened. It can be added at any time during the reaction sequence, e.g., while the ammonia solvent ($NH_3$) is still present.

In synthesis 4 (parallel addition, Example 4), feasibility of complex parallel processing was demonstrated. In this experiment, a borohydride salt ($LiBH_4$) that was premixed in THF (the secondary) solvent was added simultaneously (i.e., in parallel) to liquid ammonia solvent containing a different ammonium salt ($NH_4F$). Results demonstrated a near-quantitative yield of AB, a very surprising result given previous literature reports. Need for solid reactants, dilute reactant conditions (i.e., high solvent concentrations), and an absence of $NH_3$ are not required. Further, near-quantitative yields can be obtained from complex mixtures of various reactants. In addition, the secondary (ether-based) solvent can be added simultaneously.

In synthesis 5 (parallel addition, Example 5), a borohydride salt was mixed with an ammonium salt simultaneously (i.e., in parallel) under a positive partial pressure of $NH_3$ (about 100 psia) that allowed the salts to be mixed at a higher temperature (15.5° C.) in a liquid ammonia solvent. Addition of THF produced AB at a near quantitative yield. Results demonstrate that low reaction temperatures are not required, an additional finding demonstrating the advantages and utility of the processes of the present invention. Presence of the liquid ammonia solvent prevents side reactions such as formation of DADB and other unwanted polymeric products such as PAB that would be expected to lower the yield of AB product. Results indicate that formation of DADB is eliminated by the present invention. Findings further show that a yield of AB product can be obtained in ether and ammonia/THF solvent mixtures at concentrations 2.5 times those reported in the research literature, a new finding.

What is claimed is:

1. A method for preparing ammonia borane, characterized by the steps of:
   reacting a preselected quantity of a borohydride salt with an ammonium salt in liquid ammonia at a preselected temperature and pressure to form ammonium borohydride ($NH_4BH_4$); and adding a preselected quantity of an ether-based solvent to said ammonium borohydride to form ammonia borane (NH$_3$BH$_3$) at a yield greater than 90 percent by weight and a purity greater than 90 percent.

2. The method of claim 1, wherein said ether-based solvent is selected from the group consisting of: glyme; diglyme; ether; tetrahydrofuran, and combinations thereof.

3. The method of claim 2, wherein said liquid ammonia is not removed.

4. The method of claim 2, wherein said liquid ammonia is not removed prior to addition of said ether-based solvent.

5. The method of claim 2, wherein said ether-based solvent is added prior to addition of said liquid ammonia.

6. The method of claim 1, wherein said temperature is about 15° C. and said pressure is an ammonia partial pressure of about 7.0 atm.

7. The method of claim 1, wherein said temperature is about −40° C. and said pressure is a partial pressure of ammonia of about 1 atm.

8. The method of claim 1, wherein said temperature is selected in the range from about −80° C. to about 25° C.

9. The method of claim 1, wherein said temperature is selected in the range from about −40° C. to about 25° C.

10. The method of claim 1, wherein said pressure is a partial pressure of ammonia selected in the range from about 1 atm to about 20 atm.

11. The method of claim 1, wherein said temperature is in the range from about 0° C. to about 25° C. and said pressure is a partial pressure of ammonia selected in the range from about 100 psia to about 300 psia.

12. The method of claim 1, wherein said temperature is the same for said reacting step and for said adding step.

13. The method of claim 1, wherein said temperature is held constant for said reacting step and for said adding step.

14. The method of claim 1, wherein said borohydride salt includes a constituent selected from the group consisting of: Na, Li, K, Mg, Ca, and combinations thereof.

15. The method of claim 1, wherein said ammonium salt includes an anion selected from the group consisting of: Cl—, Br—, F—, I—, SO$_4^{2-}$, CO$_3^{2-}$, HCO$_2^{-1}$, PO$_4^{3-}$, and combinations thereof.

16. The method of claim 1, further including the steps of refluxing ammonia and continuously venting H$_2$ gas during formation of said ammonium borohydride intermediate.

17. The method of claim 1, wherein yield of AB is greater than or equal to about 99%.

18. The method of claim 1, further including the step of isolating said AB product.

19. The method of claim 17, wherein the step of isolating said AB product includes filtering said AB product.

20. The method of claim 1, wherein said method is performed in a continuous reaction process.

* * * * *